Figure 1:
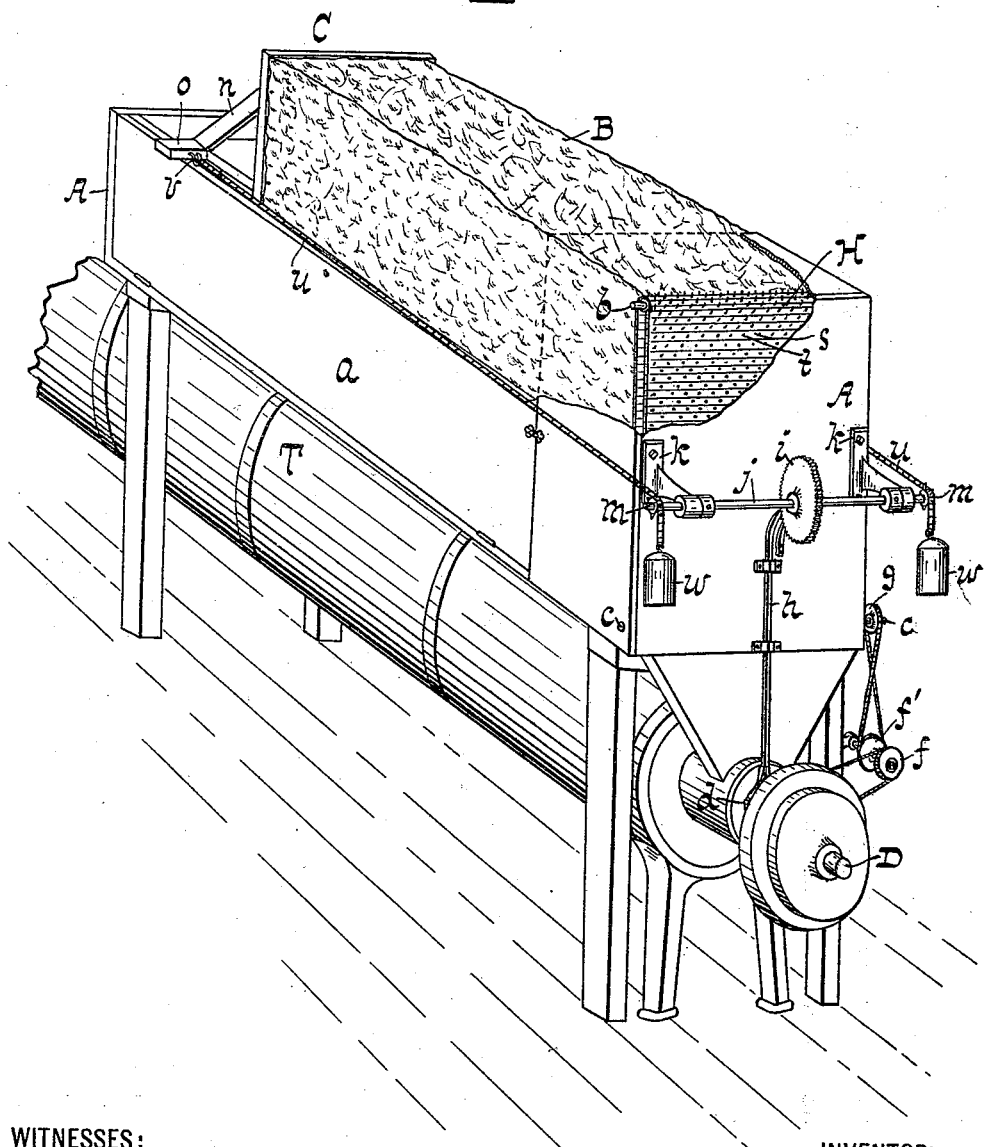

(No Model.) 4 Sheets—Sheet 1.

G. L. JAEGER.
APPARATUS FOR TEARING HOPS.

No. 551,677. Patented Dec. 17, 1895.

WITNESSES:
Chas. W. Thomas
Eugene A. Persides

INVENTOR:
Gustav L. Jaeger,
BY
A. Faber du Faur
ATTORNEY (No Model.) 4 Sheets—Sheet 2.
G. L. JAEGER.
APPARATUS FOR TEARING HOPS.
No. 551,677. Patented Dec. 17, 1895.
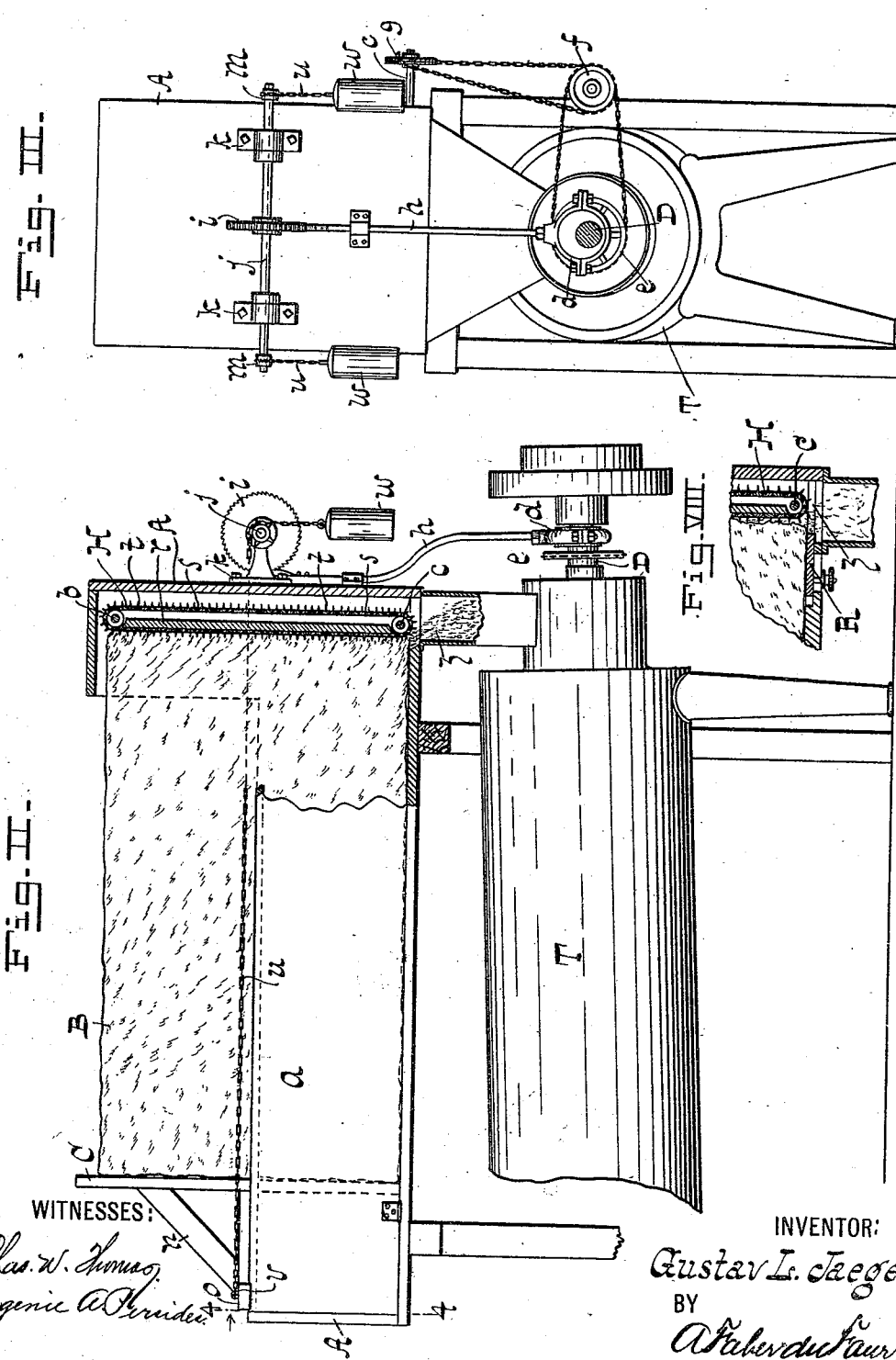
WITNESSES:
INVENTOR:
Gustav L. Jaeger,
BY
A. Faber du Faur
ATTORNEY (No Model.) 4 Sheets—Sheet 3.
G. L. JAEGER.
APPARATUS FOR TEARING HOPS.
No. 551,677. Patented Dec. 17, 1895.
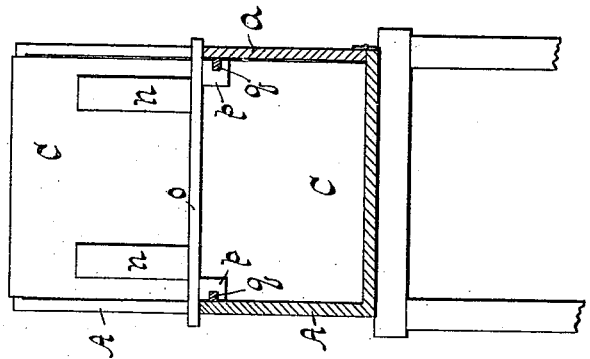
Fig. IV.
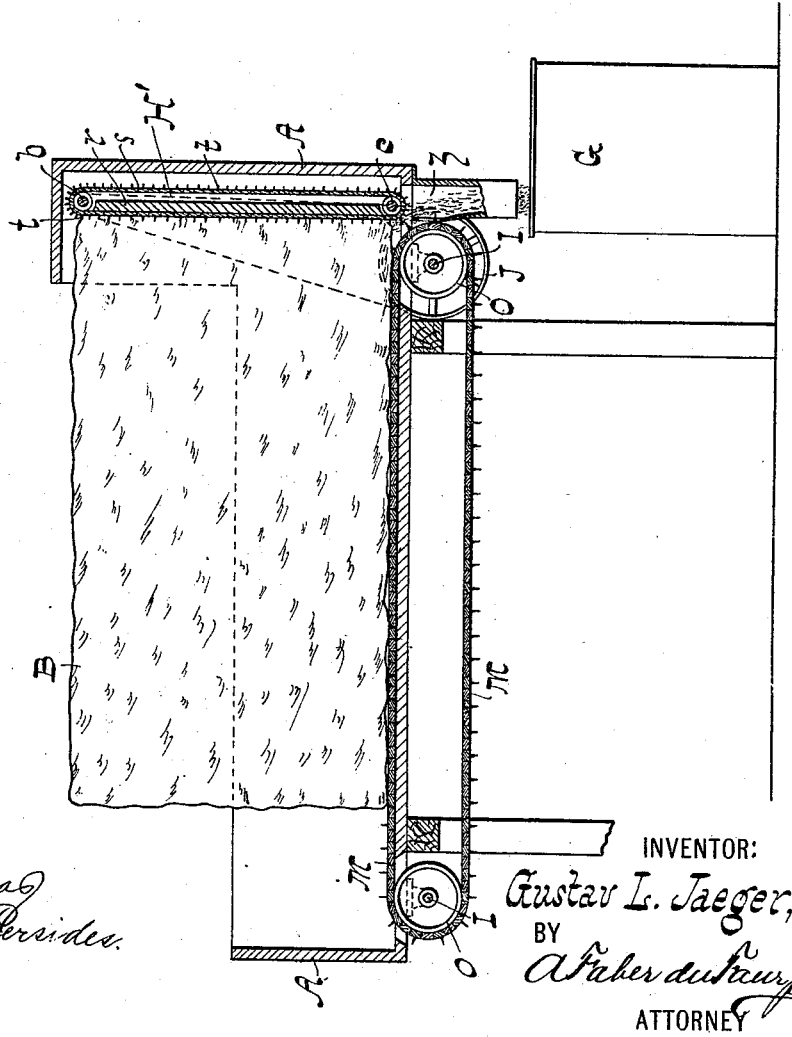
Fig. V.
WITNESSES:
Chas. S. Thomas
Eugene A. Persides.
INVENTOR:
Gustav L. Jaeger,
BY
A. Faber du Faur
ATTORNEY

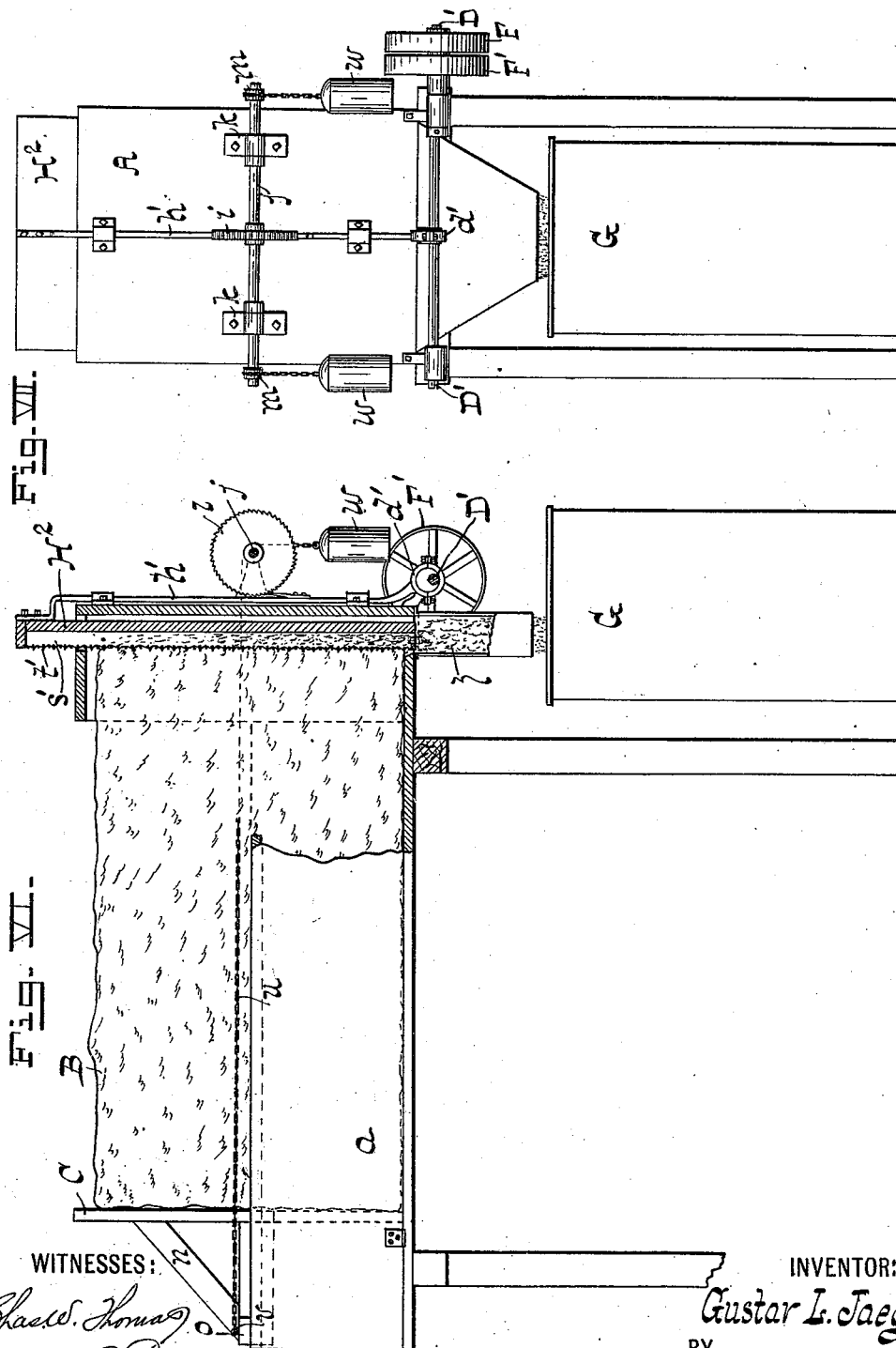

UNITED STATES PATENT OFFICE.

GUSTAV L. JAEGER, OF MAYWOOD, NEW JERSEY, ASSIGNOR TO THE BREWING IMPROVEMENT COMPANY, OF SAME PLACE AND NEW YORK, N. Y.

APPARATUS FOR TEARING HOPS.

SPECIFICATION forming part of Letters Patent No. 551,677, dated December 17, 1895.

Application filed April 18, 1895. Serial No. 546,188. (No model.)

*To all whom it may concern:*

Be it known that I, GUSTAV L. JAEGER, a citizen of the United States of America, residing at Maywood, in the county of Bergen and State of New Jersey, have invented certain new and useful Improvements in Apparatus for Tearing Hops, &c., of which the following is a specification.

My invention relates to apparatus for tearing hops, or other baled material, such as vegetable dye-stuffs, from the bale; and it consists essentially of a receptacle for the bale provided with a discharge-opening for the hops; a series of teeth arranged and supported at the discharge end of the receptacle; means for slowly feeding the bale against the teeth and means for imparting to the teeth suitable motion across the face of the bale.

The nature of my invention will best be understood when described in connection with the accompanying drawings, in which—

Figure 1 is a perspective view of an apparatus embodying my invention. Fig. 2 is a side elevation partly in section. Fig. 3 is an end view of the same. Fig. 4 is a vertical section on the line 4 4, Fig. 2. Fig. 5 is a longitudinal section illustrating a modified feed for the bale. Fig. 6 is a side elevation, partly in section, illustrating a modified form for the toothed carrier. Fig. 7 is an end view of the same. Fig. 8 is a sectional detail of an adjustable discharge-opening.

Similar letters of reference designate corresponding parts throughout the several views of the drawings.

Referring now in particular to Figs. 1, 2, and 4 of the drawings, the letter A designates a suitable receptacle for a bale of hops B, which latter is divested of bag or bands.

D is the shaft of a hop-torrefying apparatus T of a known construction. At its forward end the receptacle A has a discharge-opening $z$, which may be made adjustable, as shown in Fig. 8, by a gate R, to prevent lumps passing through, and thus regulating the fineness of the material. One of the sides $a$ of the receptacle is by preference hinged so that it can be swung out for inserting the bale. Through the forward end of the receptacle A pass two shafts $b$ and $c$, supporting on suitable wheels chains or bands connected by slats $s$ provided with teeth $t$, the slats $s$ with the chains forming an endless carrier H supported against horizontal thrust by the partition $r$ rigidly attached to the sides of the receptacle A.

C is a piston or follower fitted into the receptacle A and guided therein by guides $p$, Fig. 4, connected to the follower through board $o$ and braces $n$ $n$, and engaging guide-bars $q$. A hook or eye or other attaching device $v$ is secured to the outer ends of the board $o$ on each side of the receptacle A.

Upon the shaft D is mounted an eccentric $d$ with a ratchet-bar $h$ properly guided on the front of the receptacle A. $j$ is a shaft mounted on brackets $k$ $k$ and carrying a ratchet-wheel $i$ and two chain-wheels $m$ $m$. Chains $u$, attached to the hooks or eyes $v$, pass over the chain-wheels $m$ and have weights $w$ attached to their free ends. At each revolution of the shaft D the piston or follower C is fed forward a very small distance through chains $u$, chain-wheels $m$ $m$, ratchet-wheel $i$, and ratchet-bar $h$ on eccentric $d$. To impart motion to the endless toothed carrier I have provided the chain-wheel $e$ on shaft D, chain-wheels $f$ and $f'$ on a counter-shaft and chain-wheel $g$ on shaft $c$, all connected by chains as shown, Fig. 1.

When a bale of hops, divested of bag or bands, is placed into the receptacle and against the tooth-carrier it is gradually fed against the teeth by the piston C. The teeth tear off the hops, which fall through the opening $z$ into the torrefier T.

In Figs. 6 and 7 I have shown a modification of my apparatus, in which the eccentric $d'$ is mounted upon a shaft D' with loose and fast pulleys F and F'. The pawl-bar $h'$ is continued upward and imparts reciprocating motion to a carrier H² for the teeth properly guided and supported in the frame. The abrading-surface of the carrier, in this example, is formed of a wire screen $s'$ provided with transverse teeth $t'$. The torn hops in this instance fall into a receiver G.

In Fig. 5 I have shown a modification of the means for feeding the bale, consisting in an endless chain M with cross-slats bearing teeth, and passed over pulleys $o$ $o$ mounted on shafts I. Motion is imparted to the shaft $c$ and the toothed carrier from a pulley J on shaft I. This carrier may consist of a wire screen $s'$ provided with teeth, as described in connection with Figs. 6 and 7.

While I have herein shown the abrading-surface formed with the use of teeth, it is evident that any equivalent means may be used to form such surface.

The receptacle A may be replaced by any other suitable support for the bale.

What I claim as new is—

1. In an apparatus for tearing hops, or similar material, the combination of the receptacle for the bale provided with a discharge opening at the forward end of its bottom, a vertical toothed carrier supported in the receptacle and facing the forward end of the bale, means for imparting vertical motion to said toothed carrier across the forward end of the bale, and a feed mechanism for slowly feeding the bale against the toothed carrier, substantially as described.

2. In an apparatus for tearing hops, or similar material, the combination of the receptacle A for the bale provided with a discharge opening at the forward end of its bottom, shafts $a$ and $b$ passing transversely through the forward end of the receptacle, a toothed endless carrier presenting its teeth to the forward end of the bale, supporting wheels for the carrier secured to the shafts $a$ and $b$, means for imparting motion to the carrier downwardly across the forward end of the bale, and a feed mechanism for slowly feeding the bale against the toothed carrier, substantially as described.

3. In an apparatus for tearing hops, or similar material, the combination of the receptacle A for the bale, provided with a discharge opening $z$ at the forward end of its bottom; shafts $a$ and $b$ passing transversely through the forward end of the receptacle, a toothed endless carrier presenting its teeth to the forward end of the bale, means for imparting motion to the carrier across the face of the bale, a piston C guided in the receptacle and bearing against the rear end of the bale, and means, substantially as described, for intermittently feeding the piston toward the forward end of the receptacle, substantially as described.

4. In an apparatus for tearing hops, or similar material, the combination of the receptacle for the bale provided with a discharge opening, a toothed carrier facing the forward end of the bale, means for imparting motion to said carrier, a piston located in the receptacle, and adapted to bear against the bale, a shaft mounted at the forward end of the receptacle, wheels $m$ $m$ mounted on said shaft, chains attached to the piston and passing over the said wheels, weights attached to the free ends of the chains, and means for intermittently rotating the shaft, substantially as described.

In testimony that I claim the foregoing as my invention I have signed my name in presence of two witnesses.

GUSTAV L. JAEGER.

Witnesses:
RALPH TRAUTMANN,
A. FABER DU FAUR, Jr.